(12) United States Patent
Rozas et al.

(10) Patent No.: US 7,739,466 B2
(45) Date of Patent: Jun. 15, 2010

(54) METHOD AND APPARATUS FOR SUPPORTING IMMUTABLE MEMORY

(75) Inventors: Carlos Rozas, Portland, OR (US); Mona Vij, Portland, OR (US); David Bowler, Beaverton, OR (US); Christopher Clark, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 11/503,455

(22) Filed: Aug. 11, 2006

(65) Prior Publication Data

US 2008/0040565 A1    Feb. 14, 2008

(51) Int. Cl.
*G06F 12/14*    (2006.01)

(52) U.S. Cl. .................... 711/163; 711/6; 711/152; 711/206; 711/207; 710/200

(58) Field of Classification Search .................. 711/6, 711/145, 152, 163, 202–203, 206–207; 710/200
See application file for complete search history.

(56) References Cited

U.S. PATENT DOCUMENTS

| 6,496,909 | B1 * | 12/2002 | Schimmel | 711/163 |
| 6,986,006 | B2 * | 1/2006 | Willman et al. | 711/152 |
| 7,310,721 | B2 * | 12/2007 | Cohen | 711/206 |
| 2007/0055837 | A1 * | 3/2007 | Rajagopal et al. | 711/163 |

* cited by examiner

*Primary Examiner*—Jasmine Song
(74) *Attorney, Agent, or Firm*—L. Cho

(57) ABSTRACT

A method for managing a memory in a computer system is disclosed. A mapping of a virtual page to physical page is locked in response to receiving a request to make the page immutable. According to an aspect of an embodiment of the invention, locking the mapping of the virtual page to the physical page includes preventing mapping of the virtual page to another physical page. Other embodiments are described and claimed.

25 Claims, 6 Drawing Sheets

METHOD AND APPARATUS FOR SUPPORTING IMMUTABLE MEMORY

FIELD

An embodiment of the present invention relates to memory in computer systems. More specifically, an embodiment of the present invention relates to a method and apparatus for supporting immutable memory in a computer system.

BACKGROUND

It has been observed that substantial portions of an operating system kernel, including portions of the kernel's data, should not be changed after some milestone (e.g. after the kernel is loaded). In addition, the operating system may complete a set of initialization routines which determine a number and features of CPUs and memory regions present in a system. In many cases, those data structures should not change after initialization. Changes to these regions in memory after passing milestones are often due to either implementation errors or malicious attacks. Preserving the integrity of a running kernel is vital for maintaining system security.

Applications executed on a computer system rely on the operating system kernel to manage resources and enforce boundaries. Basic protection of the kernel is typically provided by distinguishing the execution of trusted kernel code from user-space by a processor supervisor bit and then enforcing memory protection through paging and segmentation. Further, protections such as read/write protections are provided in the page table architecture of processor memory sub-systems. However, in current page tables read/write and other permissions are maintained by the operating system. Consequently, a compromised operating system can change the read-only permission to read-write and then write to the protected memory regions. A single vulnerability in the kernel code, or an act of misplaced trust granting elevated permissions, may enable execution of hostile code in supervisor mode, which would render the computer system compromised. Additionally, since an operating system operates on virtual addresses, it is not sufficient to maintain protections only on physical pages. If protections were only on physical pages, an attacker could remap virtual addresses to unprotected pages.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
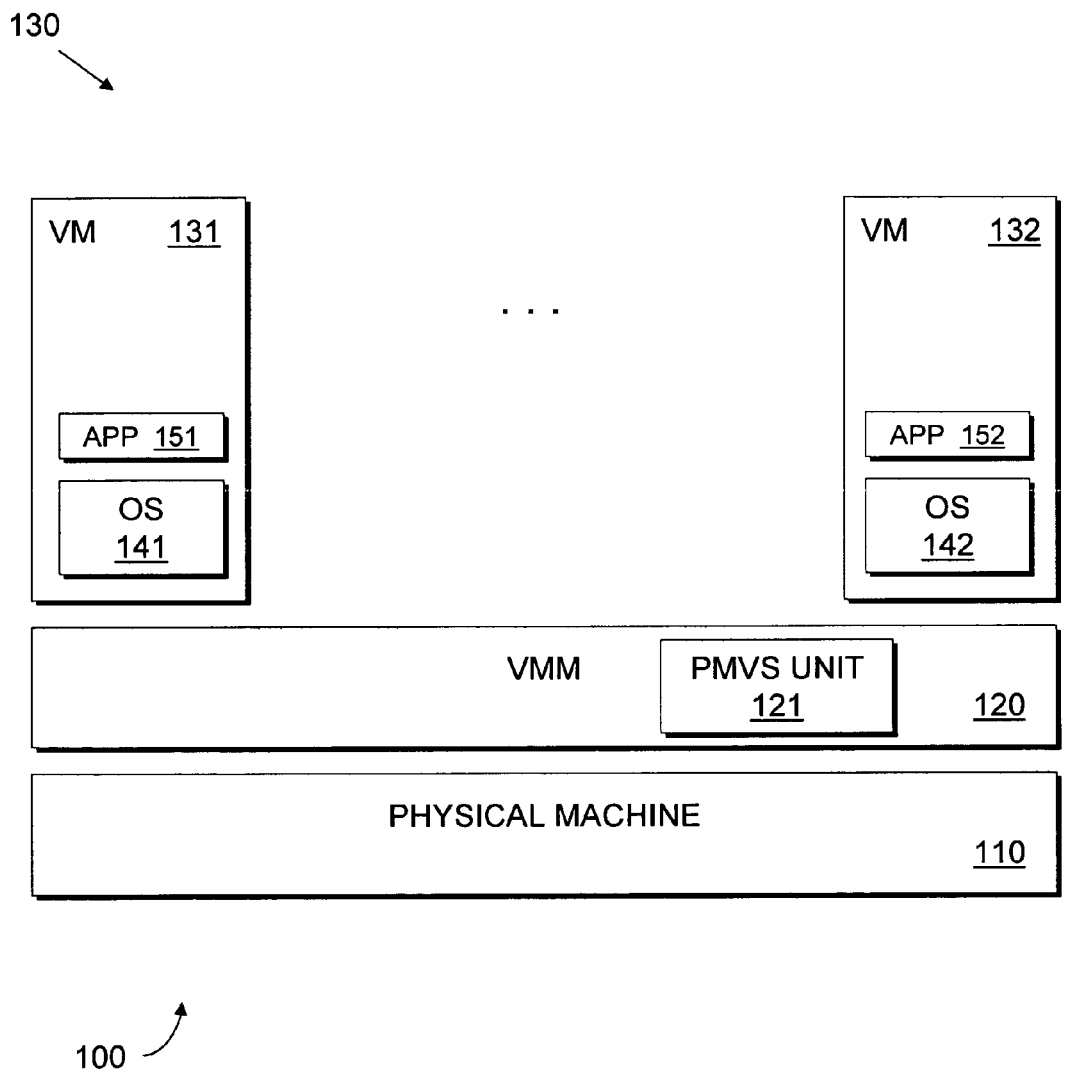
FIG. 1 is a block diagram that illustrates components of a system in which an exemplary embodiment of the invention resides.

FIG. 1 is a block diagram that illustrates components of a system 100 in which an embodiment of the invention resides. The system includes a physical machine 110. According to one embodiment, the physical machine 110 may include components of a computer system. The computer system may include, for example, one or more processors, a memory, buses, and various IO devices.

Figure 2:
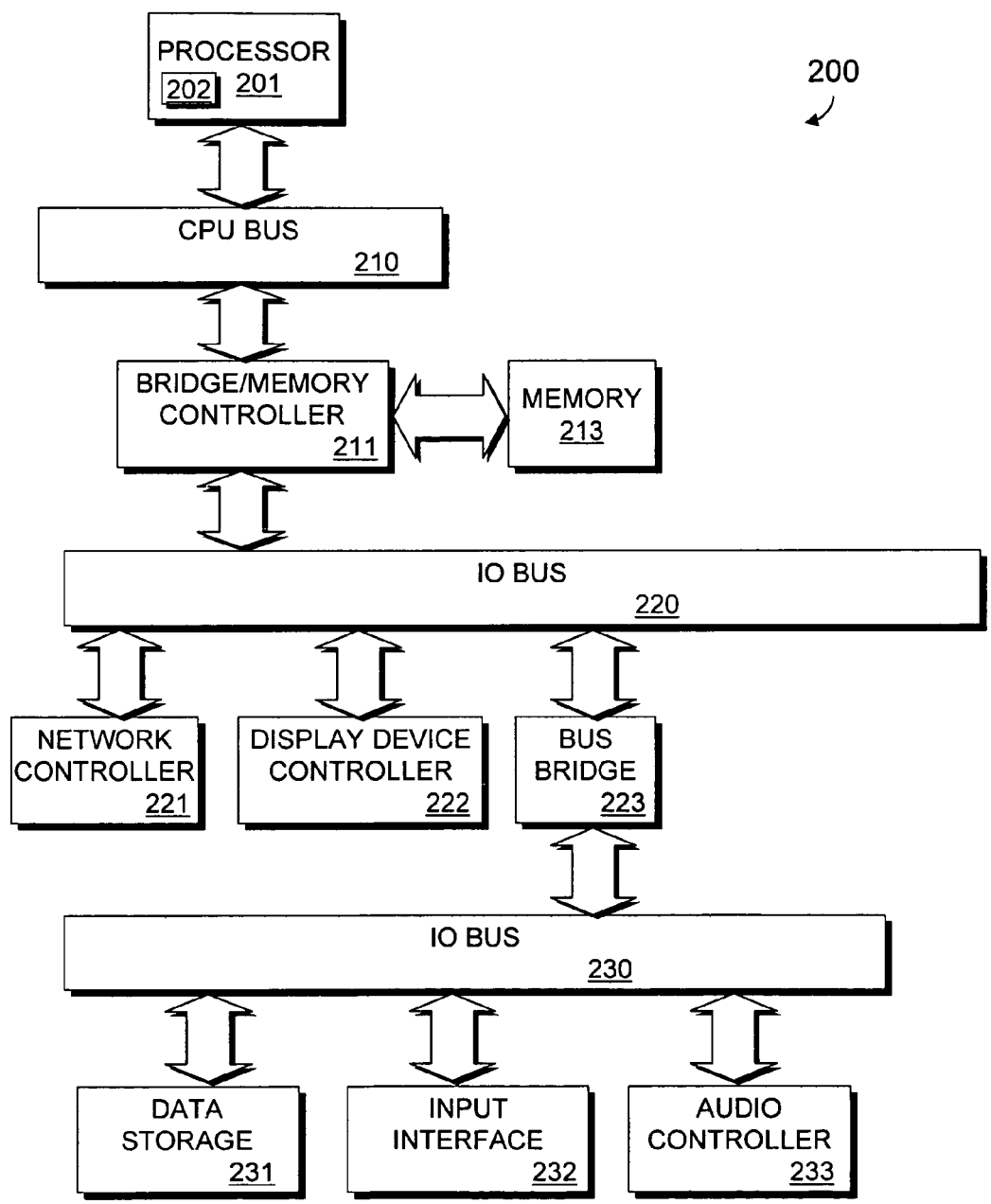
FIG. 2 illustrates an embodiment of the physical machine according to an exemplary embodiment of the present invention.

FIG. 2 is a block diagram of an exemplary computer system 200 according to an embodiment of the present invention. The computer system 200 may be used to implement the physical machine 110 shown in FIG. 1. The computer system 200 includes a processor 201 that processes data signals. The processor 201 may be a complex instruction set computer microprocessor, a reduced instruction set computing microprocessor, a very long instruction word microprocessor, a processor implementing a combination of instruction sets, or other processor device. FIG. 2 shows the computer system 200 with a single processor. However, it is understood that the computer system 200 may operate with multiple processors. Additionally, each of the one or more processors may support one or more hardware threads. The processor 201 is coupled to a CPU bus 210 that transmits data signals between processor 201 and other components in the computer system 200.

The computer system 200 includes a memory 213. The memory 213 may be a dynamic random access memory device, a static random access memory device, and/or other memory device. The memory 213 may store instructions and code represented by data signals that may be executed by the processor 201. A cache memory (not shown) may reside inside processor 201 that stores data signals stored in memory 213. The cache speeds access to memory by the processor 201 by taking advantage of its locality of access. In an alternate embodiment of the computer system 200, the cache resides external to the processor 201. A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first IO bus 220.

The first IO bus 220 may be a single bus or a combination of multiple buses. The first IO bus 220 provides communication links between components in the computer system 200. A network controller 221 is coupled to the first IO bus 220. The network controller 221 may link the computer system 200 to a network of computers (not shown) and supports communication among the machines. A display device controller 222 is coupled to the first IO bus 220. The display device controller 222 allows coupling of a display device (not shown) to the computer system 200 and acts as an interface between the display device and the computer system 100.

A second IO bus 230 may be a single bus or a combination of multiple buses. The second IO bus 230 provides communication links between components in the computer system 200. A data storage device 231 is coupled to the second IO bus 230. The data storage device 231 may be a hard disk drive, a floppy disk drive, a CD-ROM device, a flash memory device or other mass storage device. An input interface 232 is coupled to the second IO bus 230. The input interface 232 may be, for example, a keyboard and/or mouse controller or other input interface. The input interface 232 may be a dedicated devise or can reside in another device such as a bus controller or other controller. The input interface 232 allows coupling of an input device to the computer system 200 and transmits data signals from an input device to the computer system 200. An audio controller 233 is coupled to the second IO bus 230. The audio controller 233 operates to coordinate the recording and playing of sounds and is also coupled to the IO bus 230. A bus bridge 223 couples the first IO bus 220 to the second IO bus 230. The bus bridge 223 operates to buffer and bridge data signals between the first IO bus 220 and the second IO bus 230. It should be appreciated that computer systems having a different architecture may also be used to implement the physical machine 110.

Referring back to FIG. 1, the system 100 includes a virtual machine monitor (VMM) 120. The VMM 120 is a layer that interfaces the physical machine 110 and that facilitates one or more virtual machines (VMs) 130 to be run. According to an embodiment of the present invention, the VMM 120 may beta sequence of instructions stored in a memory of a computer system. The VMM 120 manages and mediates computer system resources in the physical machine 110 between the VMs 130 and allows the isolation of or data sharing between VMs 130. The VMM 120 achieves this isolation or sharing by virtualizing resources in the physical machine 110 and exporting a virtual hardware interface (i.e., a VM) that could reflect an underlying architecture of the physical machine 110, a variant of the physical machine, or an entirely different physical machine.

The system 100 includes one or more VMs 131-132 (collectively shown as 130). Block 131 represents a first VM. Block 132 represents an n-th VM, where n may be any number. According to an embodiment of the present invention, a VM may be described as an isolated model of a machine including, but not limited to, a replica of the physical machine, a subset of the physical machine, or model of an entirely different machine. A VM may include the resources of the computer system in the physical machine 110, a subset of the resources of the computer system in the physical machine 110, or entirely virtual resources not found in the physical machine.

According to an embodiment of the present invention, the VMM 120 has control of the physical machine 110 and creates VMs 130, each of which behaves like a physical machine that can run its own operating system (OS). VMs 131-132 may run operating systems (guest operating systems) 141-142 respectively where the operating systems 141-142 may be unique to one another. To maximize performance, the VMM 120 allows a VM to execute directly on the resources of the computer system in the physical machine 110 when possible. The VMM 120 takes control, however, whenever a VM attempts to perform an operation that may affect the operation of other VMs, the VMM 120 or of the operation of resources in the physical machine 110. The VMM 120 emulates the operation and may return control to the VM when the operation is completed. According to an embodiment of the present invention, this may be accomplished by directly emulating or allowing the operation after validating the safety of the operation, or a combination of the two. One or more applications (guest applications) may be run on each of the VMs 131-132. As shown in this example, applications (APPs) 151-152 are run on VMs 131-132, respectively.

According to an embodiment of the system 100, guest applications 151 and 152 may perform operations to access one or more pages in a memory of the physical machine 110. To access a page in memory, a virtual address referenced by a guest application on a VM is translated to a physical address associated with the memory. It should be appreciated that the translation may be performed by a processor in the physical machine 110. The processor may check an internal translation look-aisde buffer (TLB) or reference page tables for the translation. If the processor is unable to find a translation, the VMM 120 or associated guest operating system may be required to update the page tables for the processor to re-check. It should be appreciated that any number of techniques may be utilized for address mapping and page table implementation. For example, mapping a virtual address of a virtual page to a physical address of a physical page may involve translating a guest linear (virtual) address to a guest physical address, and a guest physical address to a host physical address. The page table may be implemented in a page table edit mode where there is a single page table which is edited by guest VMs but is managed directly by the VMM 120. Alternatively, the page table may be implemented in a shadow mode where the VMM 120 manages active page tables and the guest VM maintain their own page tables. In shadow mode, the VMM 120 synchronizes the active page table with guest page tables.

According to an embodiment of the system 100, the VMM 120 includes a physical memory virtualization subsystem (PMVS) 121. The PMVS 121 manages the page tables used by the system 100. According to an embodiment of the present invention, the PMVS 121 write-protects pages of physical memory that are designated as immutable. According to one embodiment, the write protected pages are guest physical pages. The PMVS 121 also fixes virtual to physical translations (guest virtual to guest physical translations) to prevent bypassing of read-only protections by mapping a virtual address to an unprotected physical address. The PMVS 121 injects a fault in the guest VM when there is a request to write within the guest VM to an immutable page in memory or when there is request to map a virtual address to an unprotected physical address when the virtual address was previously mapped to a protected physical address.

Figure 3:
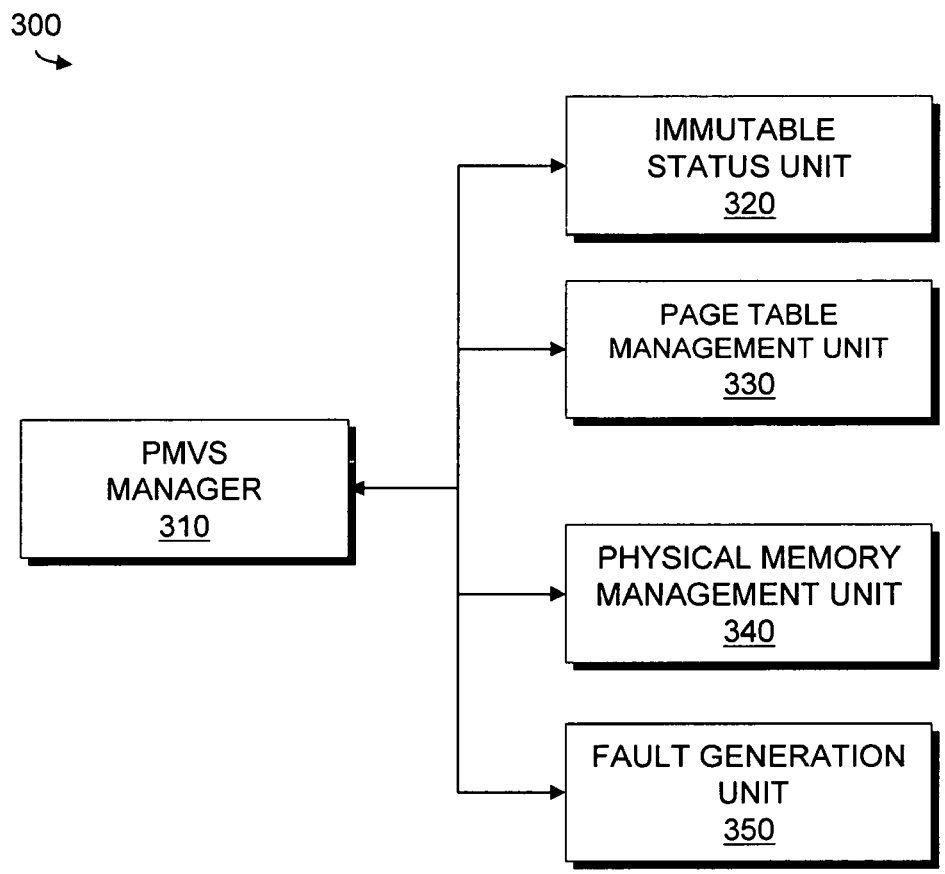
FIG. 3 is a block diagram of components of a physical memory virtualization subsystem according to an exemplary embodiment of the present invention.

FIG. 3 is a block diagram of components of a PMVS 300 according to an exemplary embodiment of the present invention. The PMVS 300 may be used to implement the PMVS 121 shown in FIG. 1. The PMVS 300 includes a PMVS manager 310. The PMVS manager 310 is coupled to and transmits information between components in the PMVS 300.

The PMVS 300 includes an immutable status unit 320. When a request is received from a VM to mark a page (frame) immutable, the immutable status unit 320 verifies that there are no current writable mappings of the requested physical page. According to one embodiment, the immutable status unit requires no writable mappings. According to an alternate embodiment, all writable mappings are downgraded to non-writable mappings. The immutable status unit 320 marks the physical page as read-only. According to an embodiment of the PMVS 300, the immutable status unit 320 marks the physical page as read-only by setting a bit in a data structure such as a page table entry in a page table for the requested virtual address. Once an entry on the page table is marked immutable, the immutable status unit 320 ensures that the entry is not modified or removed from the page table. The immutable status unit 320 may continue to ensure that the entry is not modified or removed until the associated machine is reset or some other discontinuity. According to an embodiment of the PMVS 300, the immutable status unit 320 verifies that the physical page belongs to a particular VM before marking it immutable.

The PMVS 300 includes a page table management unit 330. The page table management unit 330 locks the virtual to physical page mapping in the page tables. The page table management unit 330 ensures that once an address is marked immutable, the virtual address is not mapped to a writable page. A request from a VM to map a virtual page previously marked immutable to a writable physical page is denied. A request from the VM to map to any other physical page may also be denied. In addition, a request from a VM to map a new writable virtual page to a physical page previously marked as immutable may also be denied. In an alternate embodiment, the request may be silently downgraded to a non-writable mapping. These procedures allow the page table management unit 330 to create virtual memory regions that are permanently bound to specific physical addresses.

The PMVS 300 includes a physical memory management unit 340. The physical memory management unit 340 operates with one or more other components outside the PMVS 300 to prevent an immutable page to be written to. According to an embodiment of the present invention, the physical memory management unit 340 prevents an operating system from changing a permissions of a read only page. According to an alternate embodiment of the present invention, separate logic may be utilized for protecting physical pages. The physical memory management unit 340 may also configure memory protections associated with components of a system, such as a chipset to prevent direct memory access (DMA) bus masters from writing to protected pages.

The PMVS 300 includes a fault generation unit 350. The fault generation unit 350 generates a security fault whenever an attempted violation of an immutable region occurs. For example, the security fault may be generated when an attempt is made to write to a protected physical page. The security fault may be generated when an attempt is made to update a page table entry associated with an immutable page. The security fault may also be generated when an attempt is made to create a writable mapping to an immutable physical page. According to an embodiment of the present invention, to enable an operating system to securely detect and respond to attempted immutable memory violations, a fault handler residing in a VM may be hosted itself in an immutable region.

Figure 4:
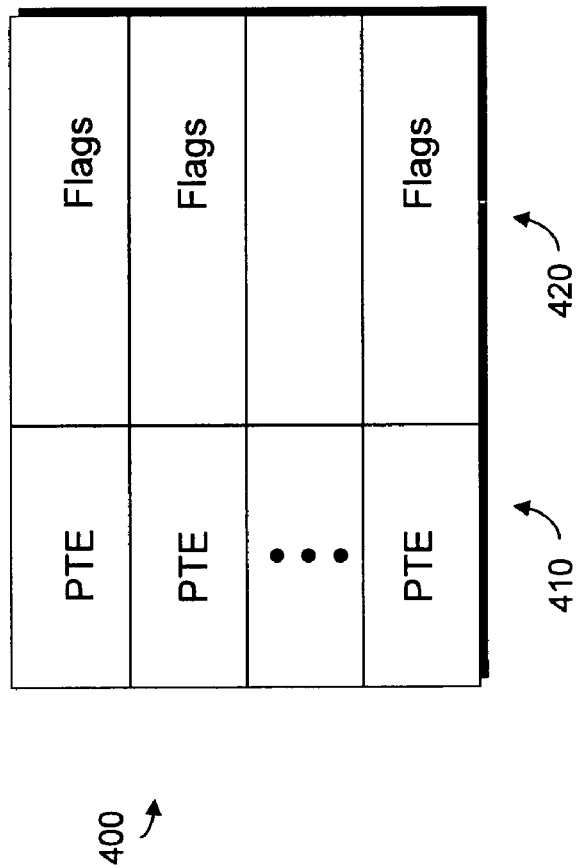
FIG. 4 is a block diagram of a page table according to an exemplary embodiment of the present invention.

FIG. 4 is a block diagram of a page table 400 according to an exemplary embodiment of the present invention. The page table 400 includes a first section 410 for storing a plurality of page table entries (PTEs). The page table entries may include virtual addresses to physical addresses mapping. The page table 400 includes a second section 420 for storing flags. According to an embodiment of the page table 400, the second section may include one or more bits that may be set for indicating a state or status of a page table entry. In this embodiment, one of the bits may be designated as an immutable bit to indicate that virtual address to physical address mapping is immutable. The bit may remain it its set state until some system discontinuity event, such as a reboot of the system. According to an embodiment of the present invention, the page table 400 includes physical addresses and a set of flags.

It should be appreciated that the page table 400 may be implemented using one or more directories and/or tables and that the mapping a virtual address to a physical address may involve translating an address though a number of intermediate layers. For example, a virtual address may be in the form of a guest linear address. The guest linear address may be translated to a guest physical address before being translated to a host physical address, which is the physical address. The page table may reside in a VMM. The page table may reside, for example, in a PMVS in the VMM. The page table may be implemented in a page table edit mode where there is one set of page tables that is directly managed by the VMM. Alternatively, the page tables may be implemented in a shadow mode where the VMM manages active page tables in the VMM and copies of the page tables residing on guest VMs. In shadow mode, the VMM synchronizes the active page tables with guest page tables.

According to an alternate embodiment of the present invention, some of the functionalities performed by a page table management unit, such as the page table management unit 330 shown in FIG. 3, may be performed by a processor instead of a VMM. For example, a component in a memory management unit 202 in the processor 201 (both shown in FIG. 2) may ensure that once an address is designated as being immutable, its associated virtual address is not mapped to a writable page and that a request from a VM to map a virtual page previously marked immutable to a writable or different physical page is denied. In addition, a request from a VM to map a new virtual page to a physical page previously marked as immutable is also denied. According to one embodiment, non-writable mappings to immutable physical pages are allowed. In this embodiment, an extended page table (EPT) may be used by the processor in place of or in addition to a page table, and the PMVS manager manages the EPT in place of or in addition to a page table. The EPT may reside in memory 213 (shown in FIG. 2). A subset of the information in the EPT may be stored in the processor 201.

Figure 5:
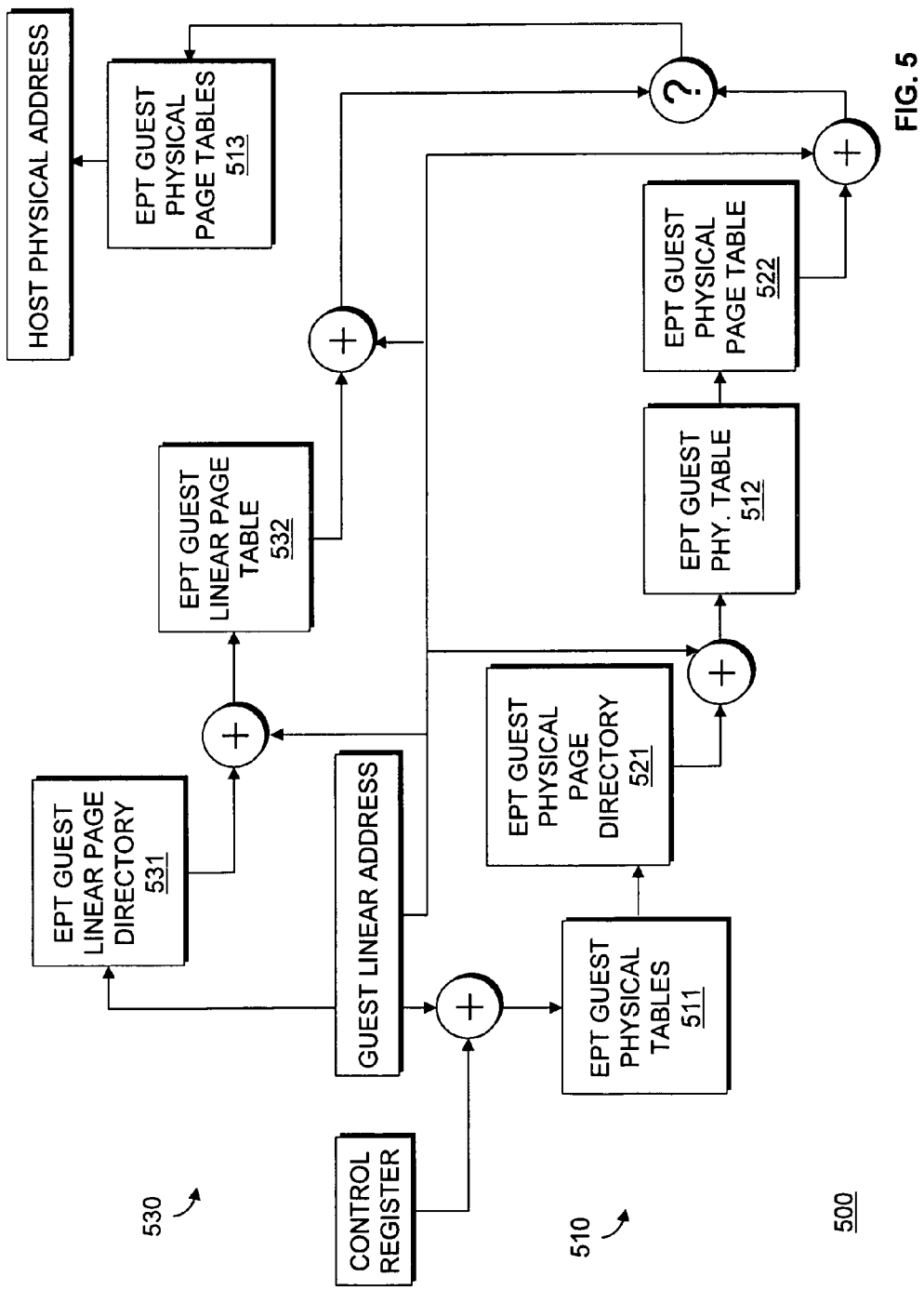
FIG. 5 is a block diagram of an extended page table according to an exemplary embodiment of the present invention.

FIG. 5 illustrates a data flow through an embodiment of an EPT 500 according to an exemplary embodiment of the present invention. The process of translating a guest physical address to a host physical address is shown in FIG. 5. The EPT 500 includes an EPT guest physical pages section 510 and an EPT guest linear pages section 530. The EPT guest physical pages section 510 includes a plurality of EPT guest physical tables 511-513, an EPT guest physical page directory 521, and a EPT guest physical table 522. When EPT support is active, physical addresses encountered by a processor while a VM is executing is translated through the tables of the EPT guest physical pages section 510. Each physical address resulting from walking the guest page table is a guest physical address that is translated to a host physical address with the final host physical address occurring at the end of the flow at the EPT guest physical table 513. According to an embodiment of the present invention, the EPT guest physical page directory 521 and the EPT guest physical page tables 511-513 may be page tables in a VM that are managed by the VM.

The EPT guest linear pages section 530 includes an EPT guest linear page directory 531 and an EPT guest linear page table 532. The EPT guest linear pages directory 531 and EPT guest linear page table 532 are managed by a VMM. According to an embodiment of the present invention, a PMVS in a VMM may allocate and free physical memory, initialize EPT guest linear page table 532, set immutability status of EPT entries on the guest linear page table 532, and handle EPT guest linear table violations. The EPT guest linear pages section 530 provides an access control check for read, write, execute, and other permission using access control bits stored in the EPT guest linear page table 532.

When EPT guest linear translation is active and guest linear page table entries are non-empty, a processor checks that the guest physical address generated by the EPT guest linear pages section 530 matches the guest physical address generated by the EPT guest physical pages section 510 to validate that the translations yield the same page. The EPT guest physical table 513 is accessed using the guest physical address to find a host physical address. If the guest physical addresses or permissions do not match, the conflict is resolved in the favor of the EPT guest linear pages section 530, and/or a notification may be generated to indicate an EPT violation.

According to an embodiment of the present invention, the EPT guest physical table has a set of permission bits which include read/write/execute for each entry. To mark a guest physical page as immutable, the VMM clears the write access bit for the appropriate EPT guest physical table entry. This will cause a fault to occur if the guest adds a writable mapping to an immutable physical page to its page tables and it attempts to write to that physical page using that mapping.

Figure 6:
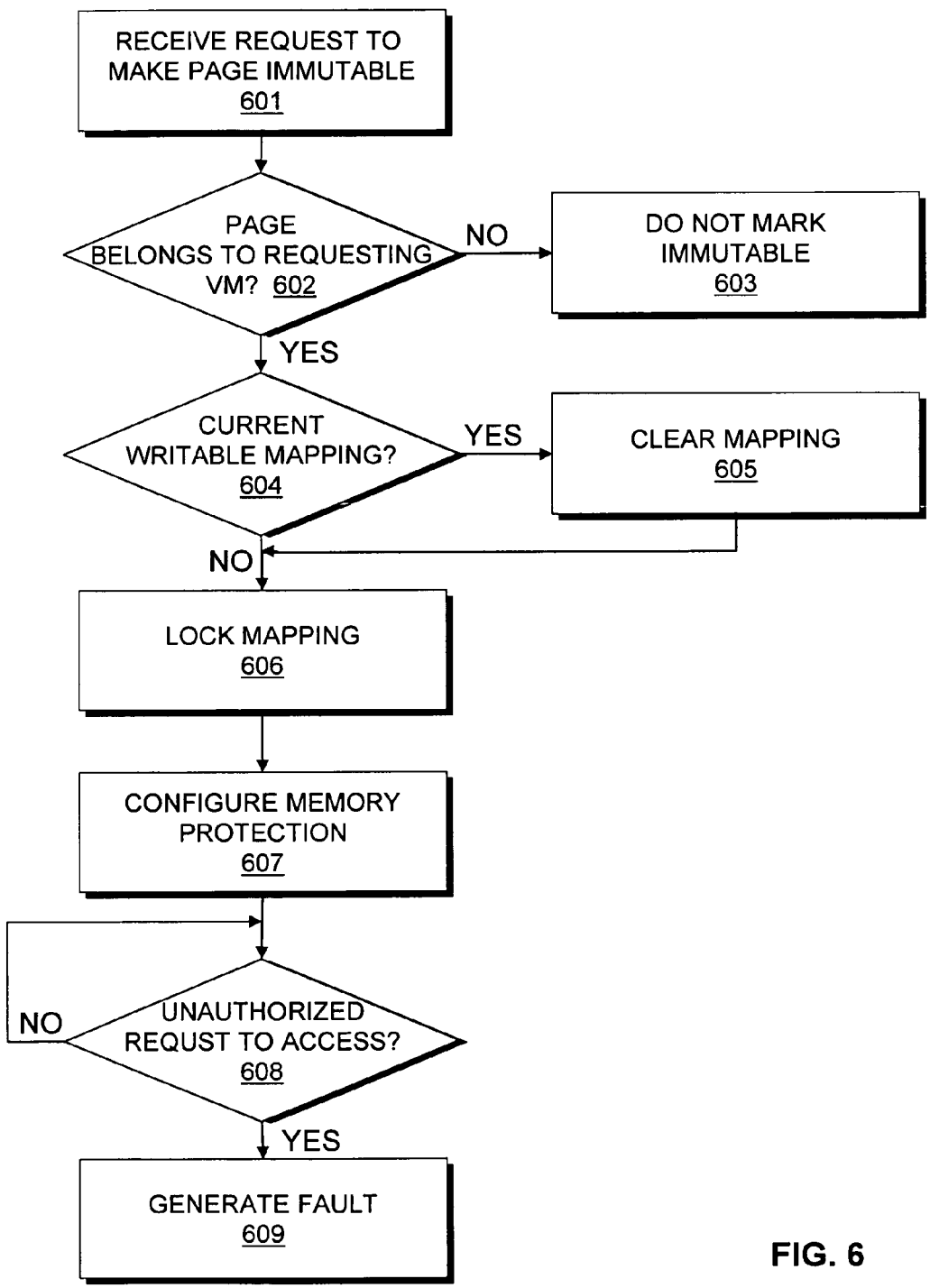
FIG. 6 is a flow chart illustrating a method for managing a memory according to an exemplary embodiment of the present invention.

FIG. 6 is a flow chart illustrating a method for managing a memory according to an exemplary embodiment of the present invention. At 601, a request is received to make a page immutable. According to an embodiment of the present invention, the request may be made by a VM.

At 602, a determination is made as to whether the page belongs to the requesting VM. If it is determined that the page does not belong to the VM, control proceeds to 603. If it is determined that the page belongs to the VM, control proceeds to 604.

At 603, the page is not marked as immutable.

At 604, it is determined whether there are current writable mappings of the requested page. If it is determined that there are writable mappings of the requested page, control proceeds to 605. If it is determined that there are no writable mappings of the requested page, control proceeds to 606.

At 605, all existing mutable mappings to the protected page are cleared. According to an alternate embodiment, existing mutable mappings may be converted to immutable mappings. Control proceeds to 606.

At 606, the mapping associated with the page is locked. The mapping that is locked may correspond to a virtual page at a virtual address to a physical page at a physical address. The locking may prevent mapping of the virtual page to another physical page or prevent the mapping of another virtual page to the physical page. According to an embodiment of the present invention, a bit on an entry of a page table or an extended page table is set to indicate that the mapping of virtual page to physical page, and the associated permissions, are immutable.

At 607, memory protection is configured. According to an embodiment of the present invention, a chipset may be configured to prevent DMA bus masters from writing to protected pages.

At 608, it is determining whether an unauthorized access to the page is being requested. The unauthorized access may involve a request to write to the page or an unauthorized mapping is being attempted. According to an embodiment of the present invention, the determination may be made by a VMM or by a processor. If an unauthorized access to the page is not being requested, control returns to 608. If an unauthorized access to the page is being requested, control returns to 609.

At 609, a fault is generated to the VM. The fault may notify the VMM or VM that a write has been attempted to the page or that an unauthorized mapping has been attempted.

FIG. 6 is a flow chart that illustrates an embodiment of the present invention. Some of the techniques illustrated may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for managing memory in a computer system, comprising:
    locking a mapping of a virtual page to physical page in response to receiving a request from a virtual machine to make the virtual page immutable by setting a bit on a page table in a virtual machine monitor to indicate that the mapping of the virtual page to the physical page is immutable.

2. The method of claim 1, wherein when a virtual page is immutable, restrictions are placed on writing to the virtual page but not reading the virtual page.

3. The method of claim 1, wherein locking the mapping of the virtual page to the physical page comprises preventing any mapping of the virtual page to another physical page.

4. The method of claim 1, wherein locking the mapping of the virtual page to physical page comprises preventing mapping of a virtual page with differing permissions to the physical page.

5. The method of claim 1, further comprising locking the physical page to prevent the physical page from being written to.

6. The method of claim 5, further comprising transmitting a fault to a virtual machine monitor or virtual machine when a write has been attempted to the physical page.

7. The method of claim 1, further comprising a chipset memory protection to prevent a direct memory access bus master from writing to the physical page.

8. The method of claim 1, wherein locking the mapping of the virtual page to the physical page comprises identifying the virtual page as immutable on an extended page table in a processor.

9. The method of claim 1, further comprising determining whether an unauthorized mapping has been attempted.

10. The method of claim 9, wherein determining whether an unauthorized mapping has been attempted is performed by a virtual machine monitor.

11. The method of claim 9, wherein determining whether an unauthorized mapping has been attempted is performed by a processor.

12. The method of claim 1, further comprising transmitting a fault when an unauthorized mapping has been attempted.

13. The method of claim 1, further comprising:
   determining whether writable mappings of the physical page exists; and
   clearing existing mappings to the physical page in response to determining writable mappings exist.

14. The method of claim 1, further comprising determining whether the virtual page belongs to the VM.

15. An article of manufacture comprising a machine accessible medium including sequences of instructions, the sequences of instructions including instructions which when executed cause the machine to perform:
   locking a mapping of a virtual page to physical page in response to receiving a request to make the page immutable by setting a bit on a page table in a virtual machine monitor to indicate that the mapping of the virtual page to the physical page is immutable.

16. The article of manufacture of claim 15, wherein locking the virtual to physical page mapping of the page comprises preventing any mapping the virtual page to another physical page.

17. The article of manufacture of claim 15, wherein locking the virtual to physical page mapping of the page comprises preventing mapping a virtual page with differing permissions to the physical page.

18. The article of manufacture of claim 15, further comprising instructions which when executed causes the machine to further perform having a virtual machine monitor determine whether an unauthorized mapping has been attempted.

19. The article of manufacture of claim 15, further comprising instructions which when executed causes the machine to further perform having a processor determine whether an unauthorized mapping has been attempted.

20. The article of manufacture of claim 15, wherein when a virtual page is immutable, restrictions are placed on writing to the virtual page but not reading the virtual page.

21. The article of manufacture of claim 15, further comprising instructions which when executed causes the machine to further perform:
   determining whether writable mappings of the physical page exists; and
   clearing existing mappings to the physical page in response to determining that writable mappings exist.

22. A physical memory virtualization subsystem, comprising:
   an immutable status unit to mark a physical page as read only upon receiving a request from a virtual machine to mark its corresponding virtual page immutable and upon determining that the virtual page belongs to the virtual machine by setting a bit on a page table in a virtual machine monitor to indicate that the mapping of the virtual page to the physical page is immutable.

23. The physical memory virtualization subsystem of claim 22, further comprising a page table management unit to prevent the virtual page from being mapped to another physical page and to prevent another virtual page with differing permissions from being mapped to the physical page.

24. The physical memory virtualization subsystem of claim 22, further comprising a fault generation unit to generate a fault in response to a request for an unauthorized access the physical page.

25. The physical memory virtualization subsystem of claim 22, wherein when a virtual page is immutable, restrictions are placed on writing to the virtual page but not reading the virtual page.

* * * * *